United States Patent Office.

EDWARD G. MARKLEY, OF BOROUGH OF SUNBURY, AND GEORGE H. BARDWELL, OF PHILADELPHIA, PENNSYLVANIA.

*Letters Patent No.* 64,343, *dated April* 30, 1867.

IMPROVEMENT IN THE MANUFACTURE OF FUEL FROM ANTHRACITE COAL DUST.

The Schedule referred to in these Letters Patent and making part of the same.

TO ALL WHOM IT MAY CONCERN:

Be it known that we, EDWARD G. MARKLEY, of the borough of Sunbury, Northumberland county, and GEORGE H. BARDWELL, of the city of Philadelphia, and State of Pennsylvania, have invented or produced a new and original mode for the manufacture of "Refuse Anthrax;" and we do hereby declare that the following is a full and exact description thereof, reference being had to the accompanying specimen.

The nature of our invention or production consists in taking of *Pulvis anthrax* of from eighty to ninety per cent., *Aqua distillata* containing twenty per cent. of *Resina præparata*, composed of due proportions of *Pix nigra*, exudations of bitumen, petroleum, potassa, nitras, and starch; and which proportions are to be graduated according to the density of the anthrax, and which *Resina præparata* is to be brought to a boiling point at 210° Fahrenheit, and immediately thereafter to be thoroughly incorporated with the *Pulvis anthrax*, and moulded into cubic blocks of from one to one hundred pounds each, subjected, at the same time, to a pressure of from one thousand pounds to five tons to the square inch.

What we claim as our invention or production, and desire to secure by Letters Patent, is—

The improved anthracite block as above described and set out, made of the materials combined in substantially the proportions above set forth.

E. G. MARKLEY,
G. H. BARDWELL.

Witnesses:

JAMES BEARD, JOHN BOWEN, for E. G. MARKLEY.
J. R. MASSEY, JAMES WALL, for G. H. BARDWELL.